United States Patent
Polgar et al.

(10) Patent No.: US 7,151,524 B2
(45) Date of Patent: Dec. 19, 2006

(54) ELECTRONIC COMMUNICATION, AND USER INTERFACE KIT

(75) Inventors: Leslie G. Polgar, Lafayette, CA (US); Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 984 days.

(21) Appl. No.: 09/934,139

(22) Filed: Aug. 21, 2001

(65) Prior Publication Data
US 2003/0038891 A1    Feb. 27, 2003

(51) Int. Cl.
*G09G 5/00* (2006.01)

(52) U.S. Cl. ............... 345/156; 345/173; 345/901; 361/683

(58) Field of Classification Search ........ 345/156–158, 345/168, 901, 905, 173; 361/683
See application file for complete search history.

(56) References Cited

U.S. PATENT DOCUMENTS

| | | | |
|---|---|---|---|
| 5,226,540 A * | 7/1993 | Bradbury | 206/576 |
| 5,552,957 A * | 9/1996 | Brown et al. | 361/683 |
| 5,761,485 A * | 6/1998 | Munyan | 715/839 |
| 5,872,557 A * | 2/1999 | Wiemer et al. | 345/156 |
| 5,914,706 A * | 6/1999 | Kono | 345/173 |
| 6,118,426 A * | 9/2000 | Albert et al. | 345/107 |
| 6,327,459 B1 * | 12/2001 | Redford et al. | 434/307 R |
| 6,593,908 B1 * | 7/2003 | Borgstrom et al. | 345/156 |
| 2002/0084988 A1* | 7/2002 | Kuo | 345/168 |
| 2002/0101405 A1* | 8/2002 | Chang | 345/168 |

OTHER PUBLICATIONS

Internet reference: www.upnp.org, "Welcome to the Universal Plug and Play Forum!", and "About the Universal Plug and Play Forum", pp. 1-12.
Internet reference: www.thinkoutside.com, "The Company Behind the Stowaway Portable Keyboard", and "Motorola and Think Outside Announce First Full-Size Portable Keyboard for Wireless Phones", pp. 1-3.

* cited by examiner

*Primary Examiner*—Richard Hjerpe
*Assistant Examiner*—Kimnhung Nguyen
(74) *Attorney, Agent, or Firm*—Thomas H. Close

(57) ABSTRACT

An electronic communications and user interface kit, including a display device; a plurality of separate electronic devices capable of directly utilizing the display device; and a portable container with an interconnection system integrated into the container and connected to the display device and the plurality of electronic devices for transferring display information from the plurality of electronic devices to the display device.

41 Claims, 3 Drawing Sheets

ELECTRONIC COMMUNICATION, AND USER INTERFACE KIT

FIELD OF THE INVENTION

The present invention relates to portable electronic devices and more particularly to electronic devices having user interface displays.

BACKGROUND OF THE INVENTION

Portable electronic devices are used for many applications. Examples include telephones, personal digital assistants (PDAs), pagers, global position systems, digital cameras, and the like. These devices typically include separate batteries, re-chargers, displays, and touch screens where necessary. For users with multiple devices, the need to carry more than one device means that redundant battery, display, and user interfaces are carried as well. These redundant components of electronic devices are costly, bulky, heavy, and a nuisance to carry and organize.

Portable organizational containers, such as notebooks or 3-ring binders with attractive covers are commonly used. Such containers incorporate papers, pads, writing instruments, calculators and the like but are not well adapted to carry electronic devices. Larger containers such as briefcases are designed for carrying a wide variety of electronic devices but do not provide a means to reduce the redundancy of components. It is also known to provide items of clothing designed to carry electronic devices. Some of these items include network connectors. Such collections of devices still do not address the problem of redundant components and power supplies.

There is a need therefore for an improved container incorporating a variety of mobile electronic devices that is convenient and does not require redundant components.

SUMMARY OF THE INVENTION

The need is met according to the present invention by providing an electronic communications and user interface kit that includes a display device; a plurality of separate electronic devices capable of directly utilizing the display device; and a portable container with an interconnection system integrated into the container and connected to the display device and the plurality of electronic devices for transferring display information from the plurality of electronic devices to the display device. The expression directly utilizing as used herein means that the electronic devices communicate directly with the display device without the need for a separate central processor.

ADVANTAGES

The present invention has the advantage that it can provide a single high quality display for a plurality of electronic devices thereby reducing the cost of providing a separate display for each device.

DETAILED DESCRIPTION OF THE INVENTION

Portable electronic devices are used for many applications. Examples include telephones, personal digital assistants (PDAs), pagers, global position systems, digital cameras, and the like. These devices typically include separate batteries, re-chargers, displays, and touch screens where necessary. For users with multiple devices, the need to carry more than one device means that redundant battery, display, and user interfaces are carried as well. These redundant components of electronic devices are costly, bulky, heavy, and a nuisance to carry and organize.

The present invention addresses these problems by providing a kit including a portable container incorporating a system interconnecting a variety of electronic devices to a single display device. The electronic devices can include a battery and the connection system can include a power distribution network, thus providing a common power source for all of the electronic devices. The separate display device can include an optional touch screen. The display device acts as a common visual interface to all of the electronic devices. Each electronic device utilizes the display device for the visual user interface requirements of that device and communicates to the display device through the interconnection network. Various software tools are available to support the use of a shared display and user input devices, as is well known in the art.

Figure 1:
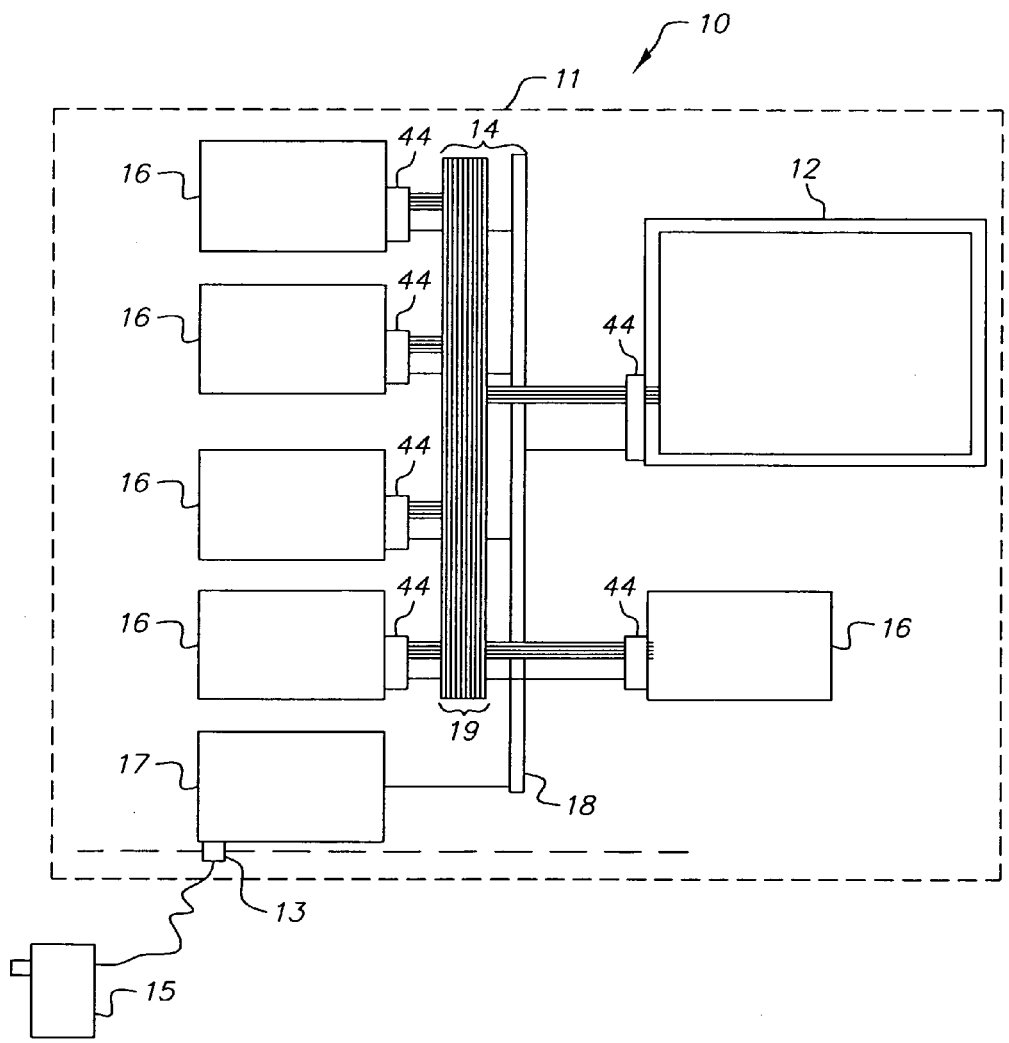
FIG. 1 is a schematic diagram illustrating an electronic communications and user interface kit according to the present invention.

FIG. 1 is a schematic diagram of an electronic communications and user interface kit according to the present invention. Referring to FIG. 1, the kit 10 incorporates a display device 12, an interconnection network 14, and separate electronic devices 16 physically placed within a container 11. The interconnection network 14 includes a power distribution network 18 and a communications network 19 supplying power and communication connections to each electronic device 16 and the display device 12. The communications network 19 may be a wired connection, or may provide a wireless connection to one or more of the electronic devices 16 and the display device 12. The electronic devices 16 and the display device 12 are each provided with a network and power interface connection 44. The power distribution network 18 is connected to a power supply 17 sufficient to supply the power needs of the electronic devices 16 and display device 12. The power supply can be a battery (preferably rechargeable) or a fuel cell. An external connector 13 can be provided for connecting to a charger 15 for recharging the power supply 17. Alternatively, the charger 15 can be included in the container 11 as part of the kit. The communications network 19 can be any standard communication connection such as Ethernet or Universal Serial Bus (USB) using any compatible existing standard communication protocols, such as TCP/IP, etc. as is well known and widely available.

Figure 2:
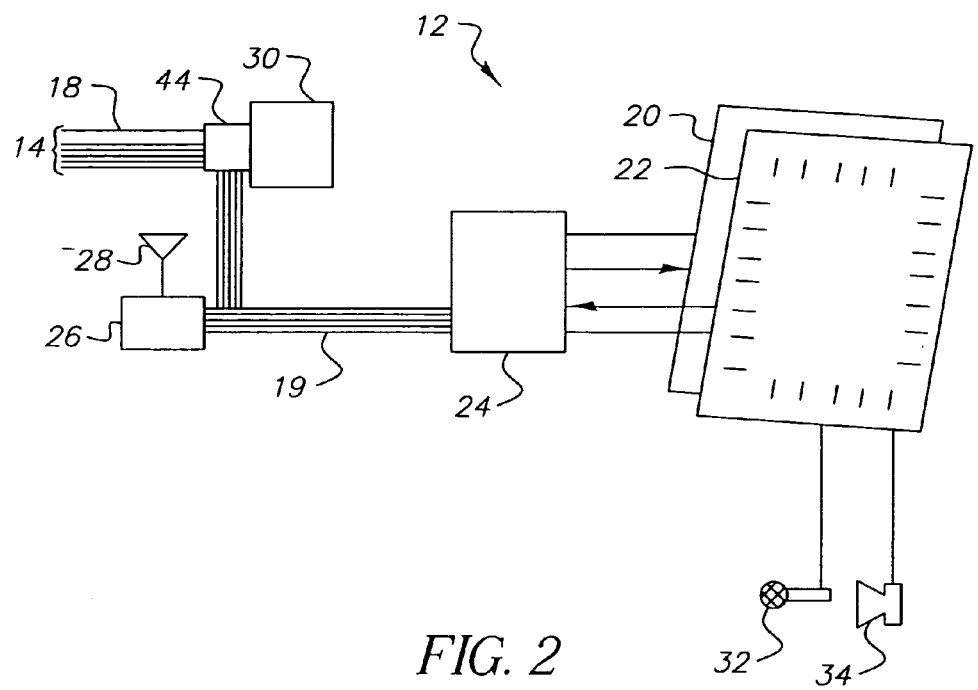
FIG. 2 is a schematic diagram of a display device having a touch screen that is useful in the kit of the present invention.

Referring to FIG. 2, the display device 12 includes a display screen 20 and may optionally include a touch screen 22 mounted with the display screen 20. Preferably, the display screen is between 5×8 cm and 12×20 cm and has a resolution of between 40 and 100 display elements. The display device 12 also includes a network interface and controller 24 (hereafter also referred to as "display interface") to operate the display screen 20 and touch screen 22 and to communicate with the electronic devices 16. The display screen 20 can be a liquid crystal display or, preferably, an organic light emitting diode display. The interface and controller 24 for the display screen 20 is conventional and known in the art. The touch screen 22 can employ 4- or 5-wire resistive touch screen technology or other touch-sensitive technology as is also known in the art.

The display device 12 may be physically connected to the connection network with wires or, alternatively, incorporate a transciever 26 and antenna 28 to communicate with a transciever 46 (shown in FIG. 3) located in the container 11 and connected to the communications network 19. Any suitable wireless communication technique may be used (e.g. RF or infrared). RF standards such as the Bluetooth standard or an 802.11a or b, or 802.15 compliant mechanism are preferred.

If a wireless connection is implemented, the display device 12 includes a power supply of its own 30. The power supply 30 can be a battery (preferably rechargeable), a capacitor, or a fuel cell. This power supply 30 may be relatively small compared to the power supply 17, and can be recharged from the larger power supply 17 in the container 11 (when connected to the connection system) and may only need to operate for a few minutes or as is necessary to interact with an electronic device 16. The display device 12 is provided with a connector 44 that can be readily disconnected from the power distribution and communications network 14. Preferably, the controller 24 automatically switches the display device 12 from a connected mode (obtaining power and recharging power supply 30 through the power distribution network 18 and communicating through the communications network 19) to a disconnected mode using the local power supply 30 and the transceiver 26 for communication with the electronic devices 16.

The electronic devices 16 are independent and can be individually removed from the network 14 without affecting the other electronic devices. The electronic devices utilize a software layer providing discovery and communication services such as UPNP (universal plug and play) as is also known in the art and commercially available.

Figure 3:
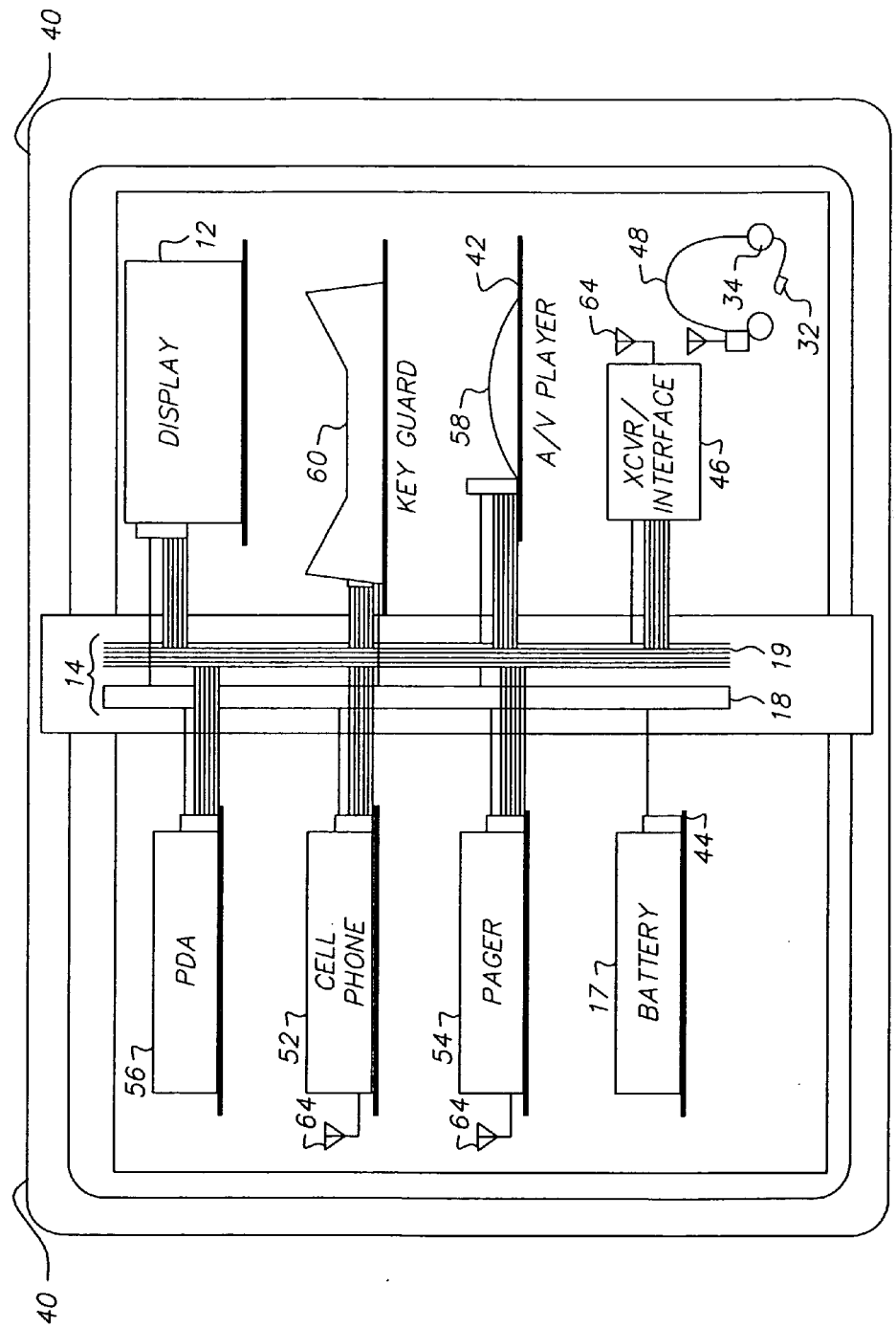
FIG. 3 is a plan view of an electronic communications and user interface kit according to the present invention.

The user display device 12 may also incorporate other interaction modalities, such as microphones 32 or speakers 34, as necessary to support the available electronic devices 16 and may be integrated or external (for example, a headset). Alternatively, as shown in FIG. 3, the microphone 32 and speaker 34 may be included as an independently powered headset with a wireless connection to a transceiver/network interface 46 connected to communications and power network 14. Alternatively, the headset can be connected directly to the communications and power network 14 through a network interface (not shown).

In operation, the devices communicate through the network 19 and to the user interface device 12. Their power is obtained through the power distribution network 18, thus enabling very small, lightweight, and inexpensive devices to use a common power supply and user interface. Any of a wide variety of electronic devices may be incorporated into the kit, including a cell phone 52, a pager 54, a PDA 56, a portable video or audio player 58, a digital camera (not shown), a television receiver, or a GPS device (not shown), and the like. A compact keyboard 60 provided with a network interface 44 connected to the network 14 can be provided. The compact keyboard 60 can be a folding keyboard such as the Stowaway™ folding keyboard sold by ThinkOutside Inc. The keyboard may also be provided with a separate power supply and wireless connection as described above with respect to the display device 12.

The electronic devices 16 may include wireless connections to external devices and communication networks such as cellular communication networks, global positioning satellites and local computer network access points, thus providing access to the Internet or to other computer systems.

Referring to FIG. 3, the container 11 can be implemented as a notebook with covers 40 as is commonly done with notebooks incorporating pads of paper, writing instruments, flat calculators, and the like. Preferably, the notebook has edge enclosures that can be zippered shut for security of the electronic devices inside. On each cover 40 are device storage locations 42 such as pockets, bands or similar device restraints where the electronic devices 16 can be secured. The container may also be used to carry conventional notebook materials such as pens and papers. At each device storage location, a connection 44 to the power distribution and communications network is provided. The interconnection system 14 can be integrated into the covers and spine of the notebook as can any antennae 64 utilized by the electronic devices and display device. A wide variety of arrangements can be created to implement the storage and connection mechanisms for the devices.

Figure 4:
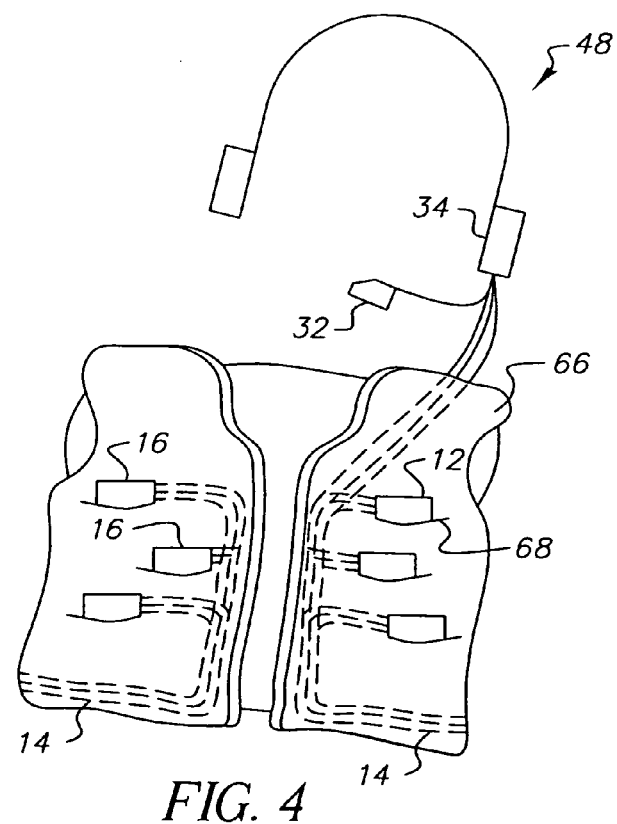
FIG. 4 is a plan view of an electronics communications and user interface kit according to the present invention, contained in an article of clothing.

Referring to FIG. 4, the container may also be implemented as an article of clothing, such as a vest 66, with pockets 68 in the vest for receiving the electronic devices and the display, and the interconnection system being integrated into the vest. A headset 48 can be connected to the communications interconnection 14 as shown.

The invention has been described in detail with particular reference to certain preferred embodiments thereof, but it will be understood that variations and modifications can be effected within the spirit and scope of the invention.

PARTS LIST 10 kit
11 container
12 display device
13 external connector
14 interconnection network
15 charger
16 electronic device
17 power supply
18 power distribution network
19 communications network
20 display screen
22 touch screen
24 controller
26 transceiver
28 antenna
30 power supply
32 microphone
34 speaker
40 covers
42 device storage locations
44 interface connection
46 transceiver/network interface
48 headset
52 cell phone
54 pager
56 PDA
58 audio/video player
60 compact keyboard
64 antenna
66 vest
68 pocket

What is claimed is:

1. An electronic communications and user interface kit, comprising:
   a portable container;
   a wired communications network integrated into said container;
   a first transceiver located in said container, said first transceiver being connected to said wired communications network;
   a display device disposed in said container, said display device having a display, a display interface, and a second transceiver, said display and display interface being operatively connected, said second transceiver being capable of communicating with said first transceiver, said display interface being switchable between a first state, wherein said display interface is operatively connected to said communications network and is disconnected from said second transceiver, and a second state, wherein said display interface is operatively connected to said second transceiver and is disconnected from said communications network;
   a plurality of separate electronic devices disposed in said container, said electronic devices each being capable of transferring display information to said display interface via one of said communications network and said transceivers, said electronic devices each being independent and individually removable from said container without affecting other said electronic devices.

2. The kit claimed in claim 1, further comprising a portable power source, and a power distribution network integrated into said container, said power distribution network distributing power to one or more of the electronic devices from the portable power source.

3. The kit claimed in claim 2, wherein the power source is a rechargeable battery.

4. The kit claimed in claim 3, further comprising a battery charger connected to the battery and a connector for connecting the charger to an external power source.

5. The kit claimed in claim 2, wherein at least one electronic device includes its own power source.

6. The kit claimed in claim 2, wherein the display device includes a display power source and the kit includes means for recharging the display power source from the portable power source.

7. The kit claimed in claim 6, wherein the display power source is a power source selected from the group comprising a battery, and a capacitor.

8. The kit claimed in claim 2, wherein the one or more of the electronic devices includes a device power source and the kit includes means for recharging the device power source from the portable power source.

9. The kit claimed in claim 2, wherein the power source is a fuel cell.

10. The kit claimed in claim 2, further comprising a keyboard, and wherein the keyboard includes a power source and the kit includes means for recharging the keyboard power source from the portable power source.

11. The kit claimed in claim 2, further comprising a headset and wherein the headset includes a power source and the kit includes means for recharging the headset power source from the portable power source.

12. The kit claimed in claim 3, further comprising a connector for connecting the battery to a charger external to the container.

13. The kit claimed in claim 1, wherein the transceivers utilize a wireless standard selected from the group of Bluetooth, 802.11a or b, and 802.15.

14. The kit claimed in claim 1, wherein said communications network and said transceivers further comprise a personal area network.

15. The kit claimed in claim 1, further comprising a communication connection for communicating with an external device.

16. The kit claimed in claim 15, wherein the external device is another electronic communications and user interface kit.

17. The kit claimed in claim 15, wherein the external device is a computer network.

18. The kit claimed in claim 15, wherein the communication connection is a wireless connection.

19. The kit claimed in claim 1, wherein the display is between 5×8 cm and 12×20 cm and has a resolution of between 40 and 100 display elements per cm.

20. The kit claimed in claim 1, further comprising a speaker and microphone.

21. The kit claimed in claim 20, wherein the speaker and microphone is a head set.

22. The kit claimed in claim 21, wherein the headset is connected directly to the display device.

23. The kit claimed in claim 21, wherein the speaker and microphone are connected wirelessly to one or more of the electronic devices.

24. The kit claimed in claim 20, wherein the speaker and microphone are connectable to one or more of the electronic devices via one of said wired communications network and said transceivers.

25. The kit claimed in claim 20, wherein the speaker and microphone are connected directly to one or more of the electronic devices independent of said wired communications network and said transceivers.

26. The kit claimed in claim 20, wherein the speaker and microphone are connected directly to the display device.

27. The kit of claim 1 wherein said container has a plurality of pockets or bands, each said pocket or band securing a respective one of said electronic devices.

28. The kit claimed in claim 1, wherein the electronic devices include one or more devices selected from the group of a cell phone, a pager, a personal digital assistant, a television receiver, an optical disk player, a global position indicator, an electronic game device, a digital camera, and a timekeeping device.

29. The kit of claim 1 wherein said display device includes a controller automatically switching said display interface between said first and second states.

30. The kit claimed in claim 1, wherein the display is an OLED display.

31. The kit of claim 1 wherein said display device includes a controller automatically switching said display interface between said first and second states.

32. The kit claimed in claim 1, further comprising a keyboard with an interface to one of said communications network and said second transceiver.

33. The kit claimed in claim 32, wherein the keyboard is connectable via the transceivers.

34. The kit claimed in claim 33, wherein the transceivers utilize a wireless standard selected from the group of Bluetooth, 802.11a or b, and 802.15.

35. The kit claimed in claim 1, further comprising a touch screen on the display device. wherein the container is a notebook with edge enclosures.

36. An electronic communications and user interface kit, comprising:

a portable container;

wired communications and power distribution networks integrated into said container;

a first transceiver located in said container, said first transceiver being connected to said wired communications network;

a display device disposed in said container, said display device having a display, a display interface, a power source, and a second transceiver, said display and display interface being operatively connected, said second transceiver being capable of communicating with said first transceiver, said display interface being switchable between a first state, wherein said display interface is operatively connected to said communications and power distribution networks and is disconnected from said power source and said second transceiver, and a second state, wherein said display interface is operatively connected to said power source and said second transceiver and is disconnected from said communications and power distribution networks;

a plurality of separate electronic devices disposed in said container, said electronic devices each being capable of transferring display information to said display interface via one of said communications network and said transceivers, said electronic devices each being independent and individually removable from said container without affecting other said electronic devices.

37. The kit claimed in claim 36, wherein the container is a notebook with edge enclosures.

38. The kit claimed in claim 37, wherein the notebook container has covers with integral restraints for restraining the electronic devices.

39. The kit claimed in claim 37, wherein the communications and power distribution networks are integrated into the covers and a spine of the notebook.

40. The kit claimed in claim 36, wherein the container is part of an article of clothing.

41. The kit claimed in claim 40, wherein the article of clothing is a vest with pockets receiving the electronic devices and the display, and the communications and power distribution networks are integrated into the vest.

* * * * *